(12) United States Patent
Palan

(10) Patent No.: US 7,187,946 B2
(45) Date of Patent: Mar. 6, 2007

(54) METHOD AND SYSTEM FOR DELIVERING WIRELESS TELEPHONE SERVICE TO CUSTOMER PREMISES VIA LOCAL LOOP TELEPHONE LINES

(75) Inventor: David B. Palan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 429 days.

(21) Appl. No.: 10/677,784

(22) Filed: Oct. 2, 2003

(65) Prior Publication Data

US 2005/0075131 A1 Apr. 7, 2005

(51) Int. Cl.
H04M 1/00 (2006.01)
H04M 3/00 (2006.01)

(52) U.S. Cl. ............... 455/554.1; 455/554.2; 349/242

(58) Field of Classification Search .. 455/554.1–554.2, 455/426.2, 555; 379/84, 242
See application file for complete search history.

(56) References Cited

U.S. PATENT DOCUMENTS

| | | | |
|---|---|---|---|
| 5,475,735 A * | 12/1995 | Williams et al. | ............ 455/403 |
| 5,946,616 A | 8/1999 | Schornack et al. | |
| 5,983,098 A | 11/1999 | Gerszberg et al. | |
| 6,188,895 B1 * | 2/2001 | Schmitz et al. | .......... 455/426.2 |
| 6,212,377 B1 | 4/2001 | Dufour et al. | |
| 6,219,525 B1 * | 4/2001 | Imai et al. | ................. 455/3.05 |
| 6,725,059 B1 * | 4/2004 | Bell | ......................... 455/554.2 |
| 6,757,528 B1 * | 6/2004 | Cardina et al. | ........... 455/426.2 |
| 6,775,556 B1 * | 8/2004 | Ghoi et al. | .............. 455/554.1 |
| 6,952,579 B2 * | 10/2005 | Oshigiri | .................... 455/426.2 |
| 6,973,329 B1 * | 12/2005 | Hamberg | ................. 455/554.2 |
| 6,983,042 B1 * | 1/2006 | Chapman et al. | ....... 379/201.02 |
| 7,035,633 B2 * | 4/2006 | Kirkpatrick | .............. 455/426.1 |
| 2003/0035525 A1 * | 2/2003 | Wu et al. | ................. 379/114.1 |
| 2004/0176129 A1 * | 9/2004 | Menon et al. | ........... 455/554.1 |
| 2004/0266476 A1 * | 12/2004 | Hogan | ...................... 455/552.1 |

FOREIGN PATENT DOCUMENTS

| | | |
|---|---|---|
| WO | WO 97/00585 | 1/1997 |
| WO | WO 02/058378 A2 | 7/2002 |
| WO | WO 03/024071 | 3/2003 |

OTHER PUBLICATIONS

NetworkWorldFusion, "FCC sets telecom competition rules," dated Aug. 25, 2003, http://www.nwfusion.com/news/2003/0825fc-cupdate.html, printed from the World Wide Web.

(Continued)

Primary Examiner—William Trost
Assistant Examiner—Marivelisse Santiago-Cordero

(57) ABSTRACT

A method and system for delivering wireless telephone service to landline customers via local loop telephone lines. Each of multiple local loop telephone lines will be interfaced with a respective wireless bridge at a point between a telephone company switch and the customer premises to which the local loop telephone line extends. Telephone equipment at the customer premises could then place and receive calls on the PSTN, and the wireless bridge will extend those calls to the PSTN via a wireless access network, thereby bypassing the ILEC's switching infrastructure.

29 Claims, 10 Drawing Sheets

OTHER PUBLICATIONS

The Business Journal, "Telecom behemoths, CLECs continue turf war," dated Jan. 6, 2003, http://seattle.bizjournals.com/ta..., printed from the World Wide Web.

Telco Systems, "PCS and Cellular Applications of the Telco Systems Product Family—White Paper," plm.telco.com/products_solutions/PCS.pdf, printed Sep. 18, 2003.

NetworkWorldFusion, "AT&T touts local success," dated Sep. 8, 2003, http://www.nwfusion.com/edge/news/2003/0908attlocal.html, printed from the World Wide Web.

c/net News.Com, "Sprint Responds to Federal Communications Commission Order on Unbundled Network Elements-Platform (UNE-P)," dated Aug. 21, 2003, http://news.cnet.com/investor/news/newsitem/0-9900-1028-21403912-0.html, printed from the World Wide Web.

NetworkWorldFusion, "UNE-P (unbundled network element-platform)," http://www.nwfusion.com/links/Encycolpedia/U/834.html, printed from the World Wide Web on Sep. 18, 2003.

TechRepublic, "Wireless can be an option for last mile connectivity," dated Jan. 29, 2001, http://techrepublic.com.com/5100-6299-1054259.html, printed from the World Wide Web.

mmWaves, "Cellular, PCS, 2G/3G Networks—high speed links between cell sites," http://www.airlinx.com/mmWaves/products.cfm/product/21-56-206.htm, printed from the World Wide Web on Sep. 15, 2003.

International Search Report and Written Opinion of the International Search Report from International Application No. PCT/US2004/031159, dated Mar. 31, 2005.

* cited by examiner

METHOD AND SYSTEM FOR DELIVERING WIRELESS TELEPHONE SERVICE TO CUSTOMER PREMISES VIA LOCAL LOOP TELEPHONE LINES

BACKGROUND

1. Field of the Invention

The present invention relates to telecommunications and, more particularly, to delivery of telecommunications services via local loop telephone lines to customer premises.

2. Description of Related Art

A typical telecommunications network includes telephone units interconnected to each other via switching equipment and transmission lines owned and operated by local exchange carriers (LECs) and interexchange carriers (IXCs). Conventionally, a LEC will own and operate a "central office" switching center that includes a switch connected with telephone lines extending out to various customer premises, such as homes and companies. The switch will then be coupled by signaling and voice trunks with the public switched telephone network (PSTN), i.e., with other switches and network elements that provide connectivity with other customer premises.

When a call is placed from a given customer premises to a dialed number, the dialed number passes along the telephone line to the central office, and the switch then sets up the call to the dialed number. If the dialed number is a local number also served by the switch, then the switch simply sets up and routes the call over a telephone line extending out to the called premises. Alternatively, if the dialed number is served by a remote central office (owned by the same or by another LEC), then the switch sets up and routes the call to the remote central office (possibly via an IXC network), and the remote central office sets up and routes the call over a telephone line to the called premises.

The telephone line that extends between a given customer premises and the telephone company switch could take various forms and can range in degree of complexity. By way of example, the telephone line could be a twisted pair of copper wires that extends all the way from the customer premises to the switch. As another example, the telephone line could extend as a pair of copper wires from the customer premises to a digital concentrator and then as a digitized channel on a cable from the concentrator to the switch.

And as still another example, the telephone line could extend as a digitized channel on coaxial cable from the customer premises to a cable company's "head-end" and then from the head-end to a cable "point of presence" that includes a telephone switch. In that case, the cable company could function as a telephone company, and its point of presence could function as a central office, with the telephone switch at the point of presence providing connectivity between telephone lines and the PSTN. Other examples of telephone lines are possible as well.

At the customer premises, a telephone line connects with a junction box that is wired to telephone units such as telephones, answering machines, fax machines and modems. At the telephone company central office, on the other hand, the telephone line typically extends through a main distribution frame (MDF) and then passes to the switch. Because the telephone line establishes a circuit connection between the customer premises and the telephone company switch, the telephone line is commonly referred to as a "local loop" or "subscriber loop." It may also be referred to as a "local loop telephone line."

In order to provide basic telephone functions such as tone generation, digit-detection and ringing, a telephone company will tie each telephone line to a respective "subscriber line interface circuit" (SLIC). The SLIC could sit at any point along the telephone line, usually at the central office. For instance each telephone line can connect with a dedicated line card at the central office, and the line card can include SLIC functionality and can couple the telephone line with the switch. Alternatively, SLIC functions can be provided by the switch itself.

Recognizing the need for competition in the local phone market, the United States Federal Communications Commission (FCC) has mandated that LECs who own local switching centers (known as incumbent LECs or "ILECs") must make certain network equipment available for lease by competitive local exchange carriers (CLECs). In one respect (referred to as "unbundled network equipment"), for instance, the mandate requires ILECs to make unbundled portions of their network infrastructure, such as individual loops and switching functions, available for lease by CLECs.

Depending on the number of customers served in a given region, it is often not economically feasible for a CLEC to install its own local loop telephone lines or switching equipment. With the benefit of the FCC's mandate, however, a CLEC can now readily offer local telephone service to customers without having to install local loops or switches to serve those customers. Rather, the CLEC can simply lease just the ILEC infrastructure that it needs in order to serve those customers who sign up for the CLEC's service, and the CLEC need not lease other portions of the ILEC's infrastructure. From the customer's perspective, the CLEC would be providing local phone service. But in reality, the ILEC's local loop lines and switch may be providing connectivity with the PSTN.

Although the FCC's mandate opens the door to greater competition in the local phone market, a CLEC wishing to provide local telephone services must still lease a significant portion of the ILEC's network infrastructure, including both the local loop and the switching infrastructure, for each customer that the CLEC will serve.

SUMMARY

The present invention provides an improved method and system for providing telephone service to customer premises over local loop telephone lines. According to an exemplary embodiment of the invention, a company can readily enter into a local phone market as a CLEC by interfacing local loop telephone lines individually with wireless transceivers that provide connectivity with a transport network such as the PSTN via a wireless access network. By way of example, each wireless transceiver can be arranged to place and receive calls via a cellular telephone system, acting on behalf of the local loop with which the wireless transceiver is interfaced.

In accordance with the exemplary embodiment, each local loop telephone line will interface with a respective wireless transceiver at a point between the telephone company switch and the customer premises to which the local loop extends. That way, the local loop telephone line can attain connectivity with the transport network via the wireless transceiver and wireless access network, thus bypassing the ILEC switch. Further, by interfacing the wireless transceiver at a point on the local loop between the customer premises and the switch, the installation can be transparent to the customer premises. That is, telephone units at the customer premises can continue placing and receiving calls as normal, although those calls would be routed over the transport network via the wireless transceiver and wireless access network. And there would be no need to install any special equipment at the customer premises.

Ideally, the point of interface will be at the ILEC central office or somewhere else where multiple local loop telephone lines are co-located, such as at a concentrator or cable head-end, so that multiple local loop telephone lines can be interfaced with wireless transceivers at once. But the point of interface could be elsewhere, and the point could vary from local loop to local loop.

In this regard, multiple local loop telephone lines can be interfaced concurrently with respective wireless transceivers through a suitably-arranged wireless bridging device. Such a device could include multiple telephone line interface ports each arranged to connect with one or more local loop telephone lines, and multiple wireless transceivers each arranged to place and receive calls via a wireless access network. Further, the device could include interface control logic, with SLIC functionality, that correlates and interfaces the local loop telephone lines with the wireless transceivers.

Preferably, each wireless transceiver will be registered to operate under a respective directory number in the wireless access network, and the customer premises to which the corresponding local loop extends will be assigned to operate under that same directory number. That way, calls placed to and from the customer premises could flow seamlessly through the wireless transceiver and wireless access network.

By way of example, when a telephone unit at a given customer premises originates a call to a dialed number, the dialed number would travel along the local loop from the customer premises, and interface logic will cause the wireless transceiver to originate a call to that dialed number via the wireless access network. Upon connection to the called party, the calling and called parties could then communicate with each other via a path comprising (i) the local loop, (ii) the wireless transceiver, (iii) the wireless access network, and (iv) the transport network.

Similarly, when a remote telephone unit places a call to the directory number of a given customer premises, the call could be routed via the wireless access network to the wireless transceiver that is registered to operate under that directory number. Interface logic would then responsively apply a ring signal on the local loop telephone line to the customer premises, thereby causing a telephone unit at the customer premises to ring. Upon connection, the calling and called parties could then communicate with each other via a path comprising (i) the transport network, (ii) the wireless access network, (iii) the wireless transceiver and (iv) the local loop to the customer premises.

Advantageously, the exemplary embodiment can allow a wireless carrier that already provides wireless coverage in a given area to quickly and inexpensively enter the landline telephone business in that area. With the FCC mandate, the wireless carrier could sign up customers and then lease just the local loop telephone lines that extend from the central office to those customers' premises, without the need to lease the ILEC's switching functionality for those local loops. The wireless carrier could then simply interface those local loop telephone lines with wireless transceivers that operate on the wireless carrier's network, so as to deliver telephone service via the local loop telephone lines to the customer premises.

These and other aspects and advantages will become apparent to those of ordinary skill in the art by reading the following detailed description, with reference where appropriate to the accompanying drawings. Further, it should be understood that the foregoing summary is merely exemplary and is not intended to limit the scope of the invention as claimed.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Conventional Landline Telephone System

Figure 1:
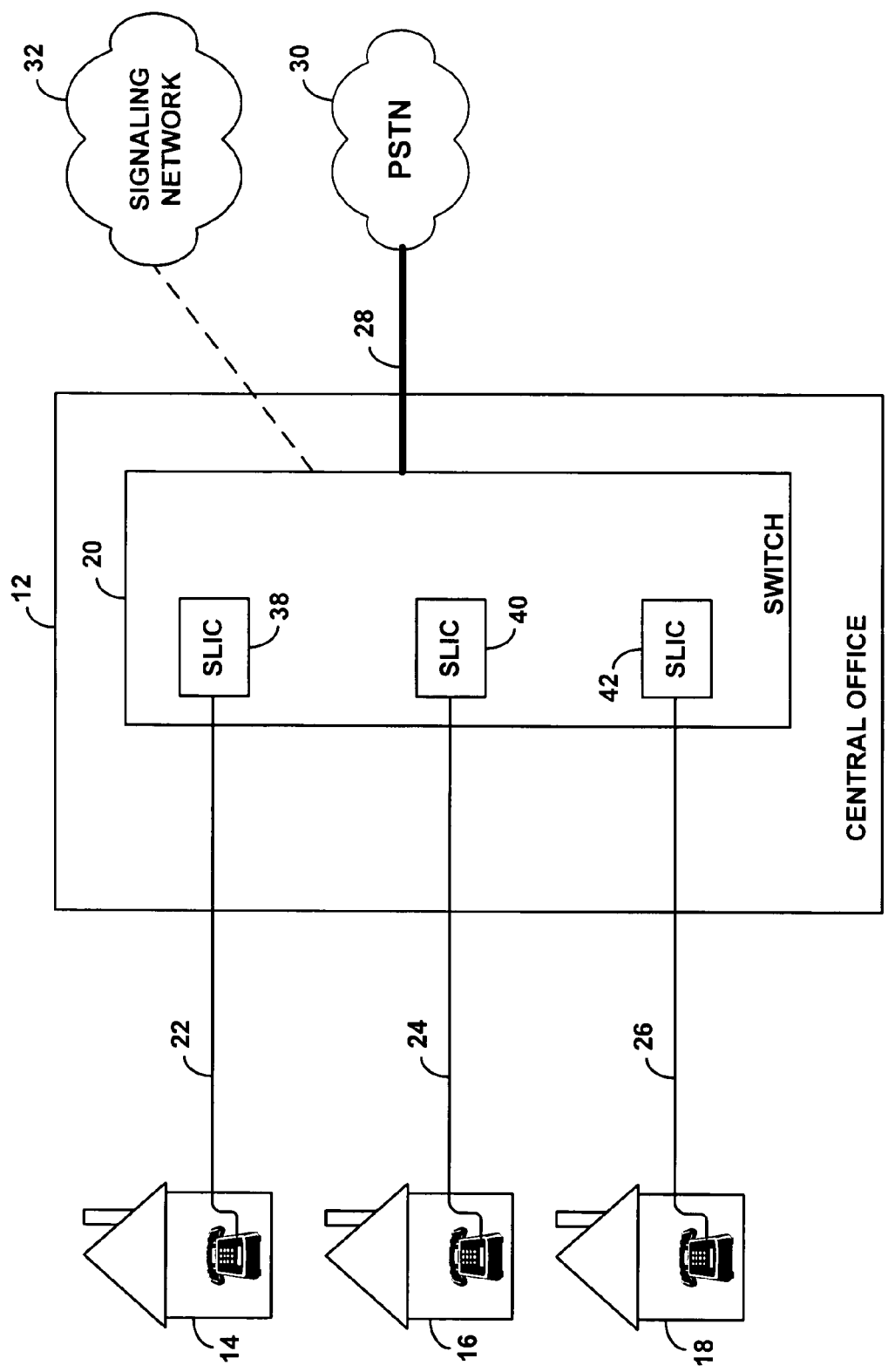
FIG. 1 is a block diagram of a prior art landline telephone system.

Referring to the drawings, FIG. 1 depicts a prior art arrangement of a basic landline telephone system. As shown in the figure, a telephone company central office (CO) 12 provides telephone service to a plurality of customer premises, shown by way of example as customer premises 14, 16 and 18. In particular, CO 12 includes a switch 20 that is coupled with each customer premises by a respective local loop telephone line, including a local loop 22 extending to customer premises 14, a local loop 24 extending to customer premises 16, and a local loop 26 extending to customer premises 18. Switch 20 is then coupled by one or more high capacity voice trunks 28 with other LEC and IXC switches of the PSTN or other transport network 30. (Only one such trunk 28 is shown, by way of example.) Further, switch 20 is coupled with a signaling network 32 that facilitates setup and teardown of call connections via other switches.

Conventionally, the telephone company assigns a telephone number respectively to each local loop telephone line, and so telephone equipment at the customer premises to which the local loop extends operates under that assigned number. For instance, when a telephone unit originates a call by dialing a telephone number, switch 20 would treat the call as originating from the number assigned to the local loop telephone line. And when switch 20 receives a request to connect a call to the assigned number, switch 20 would apply a ring signal on the local loop to the customer premises, which would cause telephone equipment at the customer premises to ring.

In normal operation, when central office 12 receives a dialed number from customer premises 14 on local loop 22, switch 20 sets up a call to the dialed number. If the dialed number is a number assigned to a local loop that is also served by switch 20, such as the number assigned to local loop 24, then switch 20 simply applies a ring signal on that other local loop. When the called party answers, switch 20 then connects the local loops together so as to allow the calling and called parties to talk. If, on the other hand, the dialed number is served by another switch (not shown) in the PSTN, then switch 20 sends a call setup message via signaling network 32 to the other switch, in an effort to set up the call. When the remote switch responds that a connection is available, switch 20 then connects the call via a voice trunk to the remote switch. Once the call path is fully established, the calling and called parties can then talk.

Similarly, when switch 20 receives a request from another switch to connect a call to a dialed number served by switch 20, such as the number assigned to local loop 22, switch 20 applies a ring signal on the local loop, which causes telephone equipment at the customer premises to ring. When the called party answers, switch 20 then connects the call to the local loop, thereby allowing the call to proceed.

FIG. 1 depicts each customer premises graphically as a house, which could reside at a particular street address in a neighborhood. It should be understood, however, that the customer premises could take other forms as well, and various customer premises could differ in form from one another. For example, rather than being a house, a customer premises could be an office building or a floor of an office building. Other examples of customer premises are possible as well.

Further, although FIG. 1 depicts a single landline telephone within each customer premises, it is possible (and likely) that each customer premises could contain multiple landline telephone units. As noted above, the telephone equipment in a given customer premises would typically be tied to a junction box that would terminate the local loop telephone line extending from the CO switch 20. Further, although FIG. 1 shows only one local loop telephone line extending between switch 20 and each customer premises, it is equally possible that multiple local loop telephone lines can extend between the switch and a given customer premises, so as to provide multiple phone lines to the customer premises.

As noted above, the local loop telephone line that extends between the switch and a given customer premises could take various forms, and the form of one local loop can differ from the form of another local loop. In a basic arrangement, for instance, a local loop could take the form of a twisted pair of copper wires that extends all the way between the customer premises and the switch 20. Alternatively, the telephone line could be more complex, perhaps extending through one or more intermediate entities and perhaps changing forms over the path from the customer premises to the switch 20. FIG. 2 (parts A and B) depicts two such arrangements by way of example.

Figure 2A:
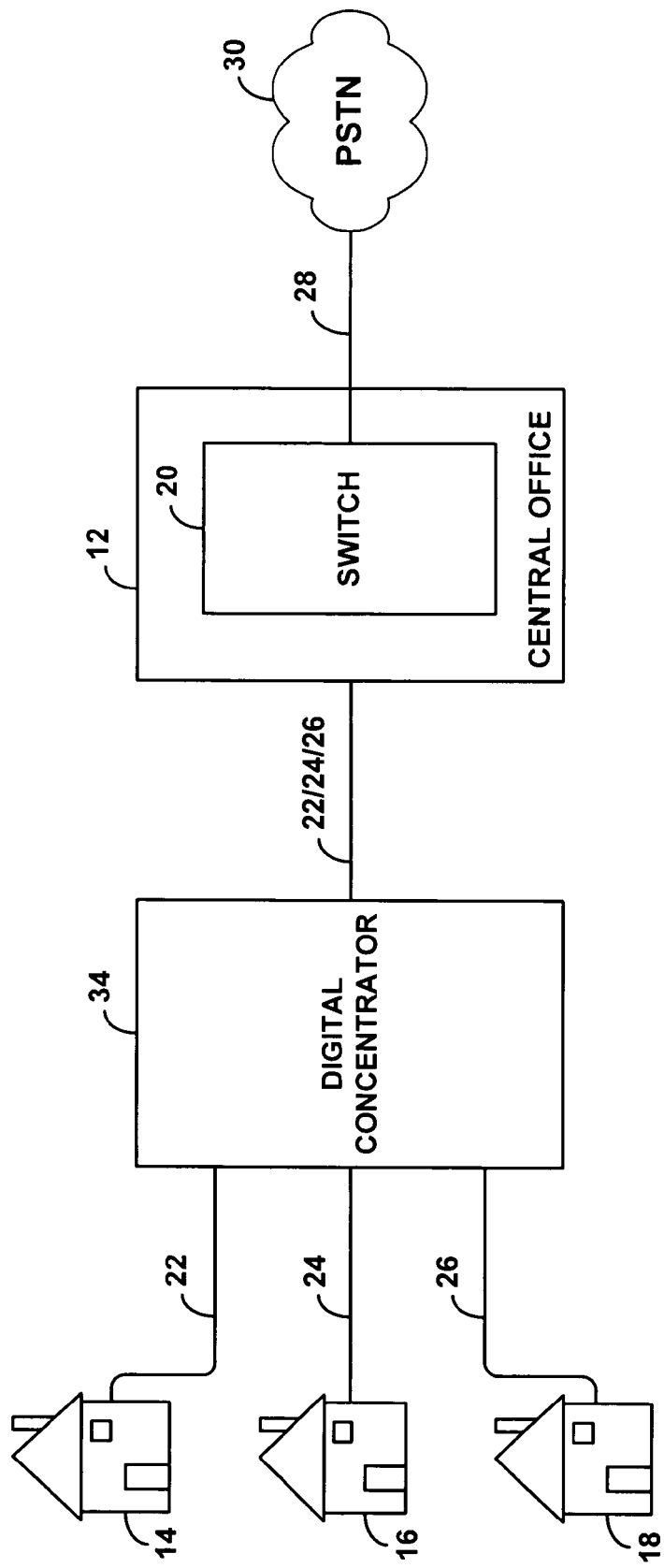
FIG. 2A is a block diagram showing how local loop telephone lines can extend through a digital concentrator.

FIG. 2A first shows that a local loop telephone line can extend as a twisted pair or in some other form from a customer premises to a digital concentrator 34 and then as a digital channel from the concentrator to the switch 20. By way of example, the concentrator could be a network interface unit (NIU) that sits among a neighborhood of homes.

In this arrangement, the concentrator can function to digitize voice communications coming from a customer premises and to combine together the digitized voice communications with voice communications from other customer premises, and vice versa for communications coming from the central office. For instance, the concentrator could time division multiplex (TDM) the communications from various customer premises and send a resulting TDM stream over fiber or coax to the central office.

Figure 2B:
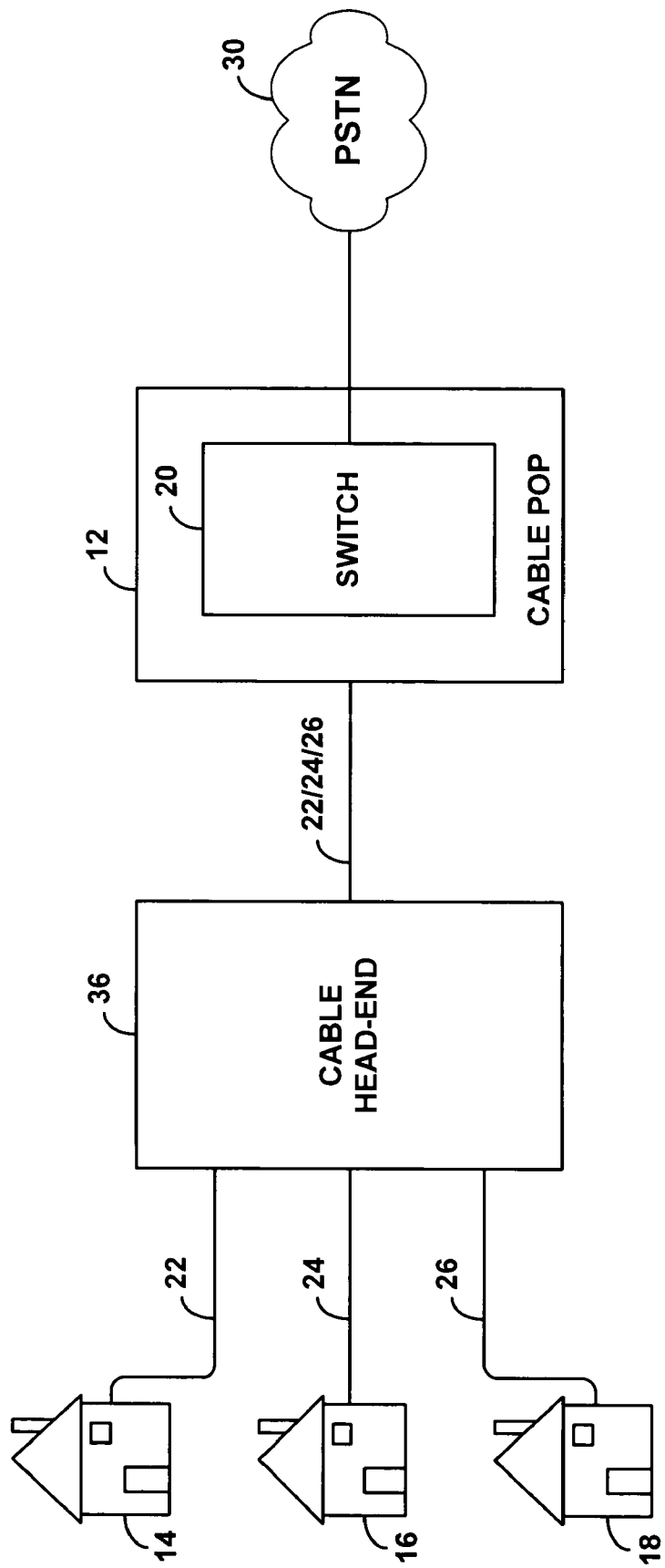
FIG. 2B is a block diagram showing how local loop telephone lines can extend through a cable head-end.

FIG. 2B next shows that a local loop telephone line can extend from a customer premises 16 to a cable head-end office 36, and from the head-end to the switch 20. In this arrangement, switch 20 resides at a cable point of presence (POP), which functions as telephone company central office 12. This arrangement allows the customer premises to receive telephone service over the same coaxial cable that delivers cable-television service to the premises.

As still another example (not illustrated), a local loop telephone line could extend digitally over fiber, coaxial cable, twisted pair and/or in some other form all the way from a customer premises to the switch 20. Further, many other examples of local loop telephone lines, now know or later developed, may be possible as well.

As further noted above, each local loop will be tied to a respective SLIC, which serves to provide basic telephone functions such as on-hook and off-hook detection, dialed-digit detection, tone generation, and ringing. For example, when telephone equipment at the customer premises goes off-hook, the SLIC detects the off-hook condition and applies a dial tone to the line. When a telephone equipment dials an number on the line (e.g., as dual-tone-modulated frequency (DTMF) tones, or through pulse dialing), the SLIC then detects the dialed digits and may output a digital representation of the dialed digits.

Further, if the dialed number rings or is busy, the SLIC applies a ring tone or busy signal on the line. And when a call is being placed to the customer premises, the SLIC applies a ring voltage or other signal to the line to cause telephone equipment at the customer premises to ring. Additionally, the SLIC functions to detect when the telephone equipment at the customer premises goes on-hook. Of course, these SLIC functions are only examples. In some telephone systems, a SLIC may serve other functions and may omit some of these functions.

Generally speaking, SLIC functions can be carried out at any point along the local loop between the customer premises and switch 20. For example, each local loop could connect to a line interface card on a rack at CO 12, and the line interface card could include SLIC functionality and could then connect the local loop with a respective port on switch 20. As another example, the SLIC functions could be provided at an intermediate point between the customer premises and the CO 12, such as at a concentrator 34 or at a cable head-end 36 for instance.

Alternatively, as shown in FIG. 1, the SLIC functions for each local loop telephone line could be provided as logic within the switch 20 itself. Thus, as shown, the switch could include a SLIC module 38 for local loop 22, a SLIC module 40 for local loop 24, and a SLIC module 42 for local loop 26. Still alternatively, the SLIC functions for a given local loop could be distributed, including one or more SLIC functions carried out at one point along the line and one or more other SLIC functions carried out at another point along the line.

The voice trunk 28 that couples switch 20 to other switches of the PSTN can also take various forms. Most commonly, for instance, the voice trunk could be a bundle of fiber-optic cables on which calls are multiplexed. Alternatively, however, the voice trunk could take other forms, such as satellite or microwave links between PSTN switches for instance.

2. Overview of Exemplary Embodiment

In accordance with an exemplary embodiment of the invention, each local loop telephone line will interface with a wireless transceiver at some point between switch 20 and the customer premises to which the local loop extends. The wireless transceiver will then provide connectivity between the local loop and a wireless access network through which calls can be placed and received. In this manner, telephone equipment at the customer premises can place and receive calls via a communication path comprising the local loop telephone line, the wireless transceiver, and the wireless access network, thereby bypassing the CO switch 20.

The exemplary embodiment can be usefully carried out by a telephone company that already provides wireless telephone service (e.g., cellular telephone service) in an area covering the CO 12 or in an area covering another location along the local loop telephone line(s). Conveniently, such a telephone company can function as a CLEC by signing up certain customers to use its brand of local telephone service, leasing from the ILEC the local loop telephone lines that extend out to those customers' premises, and interfacing each local loop with a respective wireless transceiver that is set to place and receive calls via the wireless telephone system. At the same time, the local loop telephone lines that extend to customers who want to continue using the ILEC's service can remain connected with the ILEC's CO switch 20 as normal.

Figure 3:
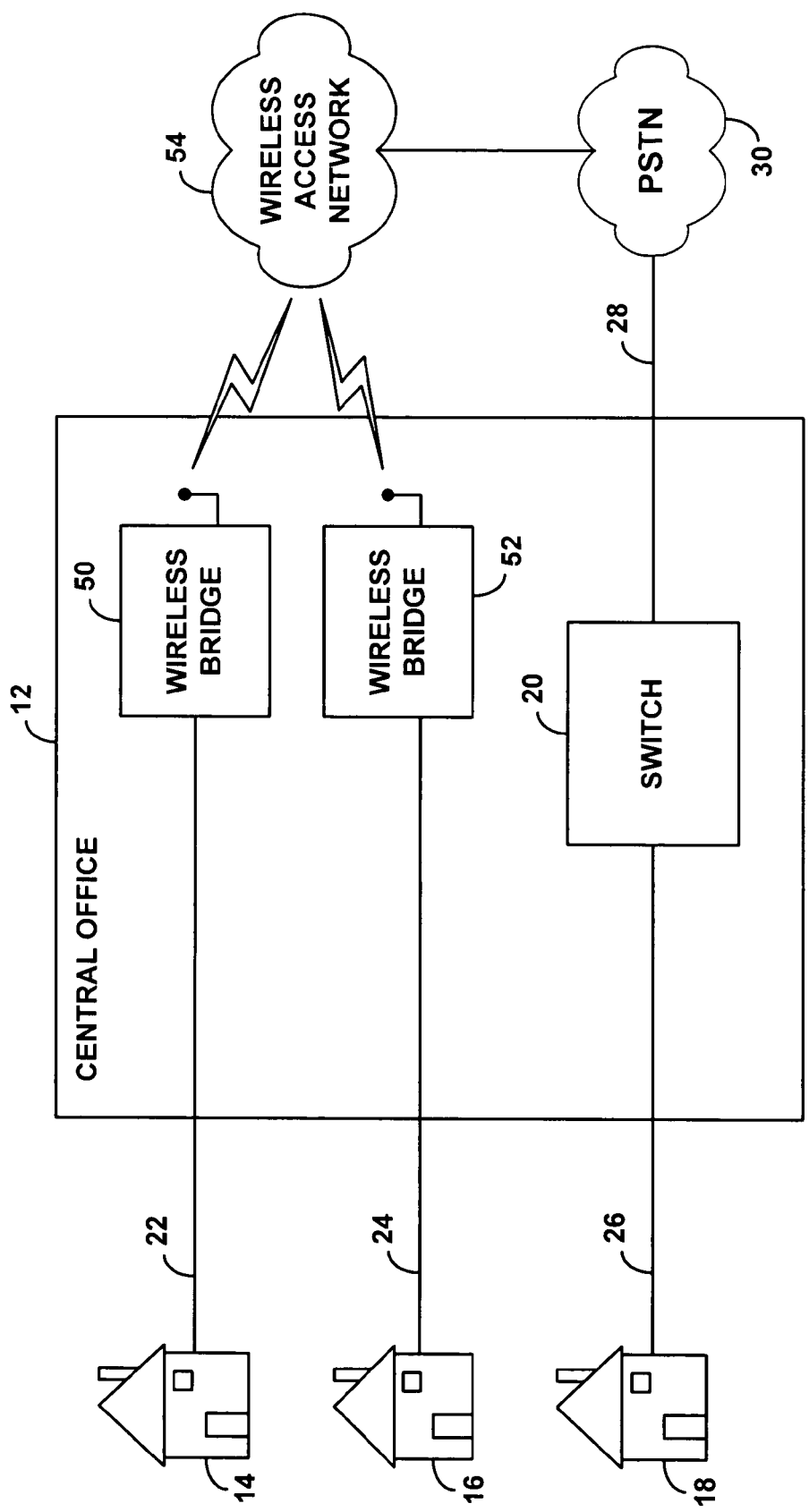
FIG. 3 is a block diagram depicting placement of wireless bridges in accordance with the exemplary embodiment.

FIG. 3 is a simplified block diagram generally depicting a modification of the arrangement of FIG. 1 in order to carry out the exemplary embodiment. In this example modification, local loop telephone lines 22 and 24 are interfaced at CO 12 with respective wireless bridges 50, 52, while local loop telephone line 26 remains coupled with the ILEC's switch 20. Thus, customer premises 14 will place and receive calls via local loop 22 and wireless bridge 50, and customer premises 16 will place and receive calls via local loop 24 and wireless bridge 52, but customer premises 18 will continue to place and receive calls via local loop 26 and CO switch 20. (Note that, as used herein, the term "wireless bridge" generally refers to an entity that interfaces between a local loop and a wireless access network. As such, a "wireless bridge" is not necessarily a conventional "bridge.")

Although FIG. 3 depicts just two local loops being interfaced with respective wireless bridges, it should be understood that more or fewer local loops could be interfaced with respective wireless bridges in accordance with the exemplary embodiment. Further, although FIG. 3 depicts the interfacing being carried out at the CO 12, it should be understood that the interfacing could equally be carried out elsewhere on a given local loop between the switch 20 and the customer premises to which the local loop extends. Carrying out the interfacing at the CO, however, is likely to be most convenient.

Generally speaking, each wireless bridge will be arranged to place and receive calls on a transport network such as the PSTN 30 via a wireless access network 54. The wireless access network could be a cellular telephone system, for instance, and each wireless bridge could function as a cellular telephone in the system.

In this regard, each wireless bridge could be assigned to operate under a respective directory number (telephone number), just as a cellular telephone is normally assigned to operate under a particular directory number. And the local loop with which the wireless bridge interfaces would be assigned to operate under that same directory number, so that telephone equipment at the customer premises to which the local loop extends would be considered to have that directory number. (For instance, directory-assistance and emergency service (911) databases could list the directory number as being located at the street address of the customer premises. Further, call activity via the telephone equipment at the customer premises could be billed under the assigned directory number.)

For example, if a local loop already has a directory number assigned by the ILEC, then the wireless bridge that is interfaced with that local loop could be set to operate under that same directory number. Alternatively, the wireless bridge could be set to operate under any directory number, and the local loop could then be assigned to operate under the same directory number as the wireless bridge.

In basic operation, when telephone equipment at customer premises 14 originates a call to a given number, the dialed number would pass along local loop 22, and wireless bridge 50 would responsively originate a call via wireless access network 54 to that dialed number. Upon connection of the call, the wireless bridge would then tie the wireless call together with the local loop 22, so that the call can proceed. Similarly, when telephone equipment at customer premises 16 originates a call to a given number, the dialed number would pass along local loop 24, and wireless bridge 52 would responsively originate a call via wireless access network 54 to the dialed number and then tie the wireless call together with the local loop 24.

Conversely, when a PSTN call is placed to the directory number of local loop 22 (to customer premises 14), the call would be routed via wireless access network 54 to wireless bridge 50, since wireless bridge 50 operates under that directory number. Wireless bridge 50 would then apply a ring signal on local loop 22 to cause telephone equipment at customer premises 14 to ring and, upon connection, would tie the wireless call with the local loop 22 so as to allow the call to proceed. And similarly, when a PSTN call is placed to the directory number of local loop 24 (to customer premises 16), the call would be routed via wireless access network 54 to wireless bridge 52, since wireless bridge 52 operates under that directory number. Wireless bridge 52 would then apply a ring signal on local loop 24 to cause telephone equipment at customer premises 16 to ring and, upon connection, would tie the wireless call with the local loop 22.

Advantageously, the exemplary embodiment can support multiple concurrent calls. For instance, wireless bridge 50 could interface a call between local loop 22 and wireless access network 54 at the same time as wireless bridge 52 interfaces a call between local loop 24 and wireless access network 54.

3. Exemplary Wireless Access Network

Figure 4:
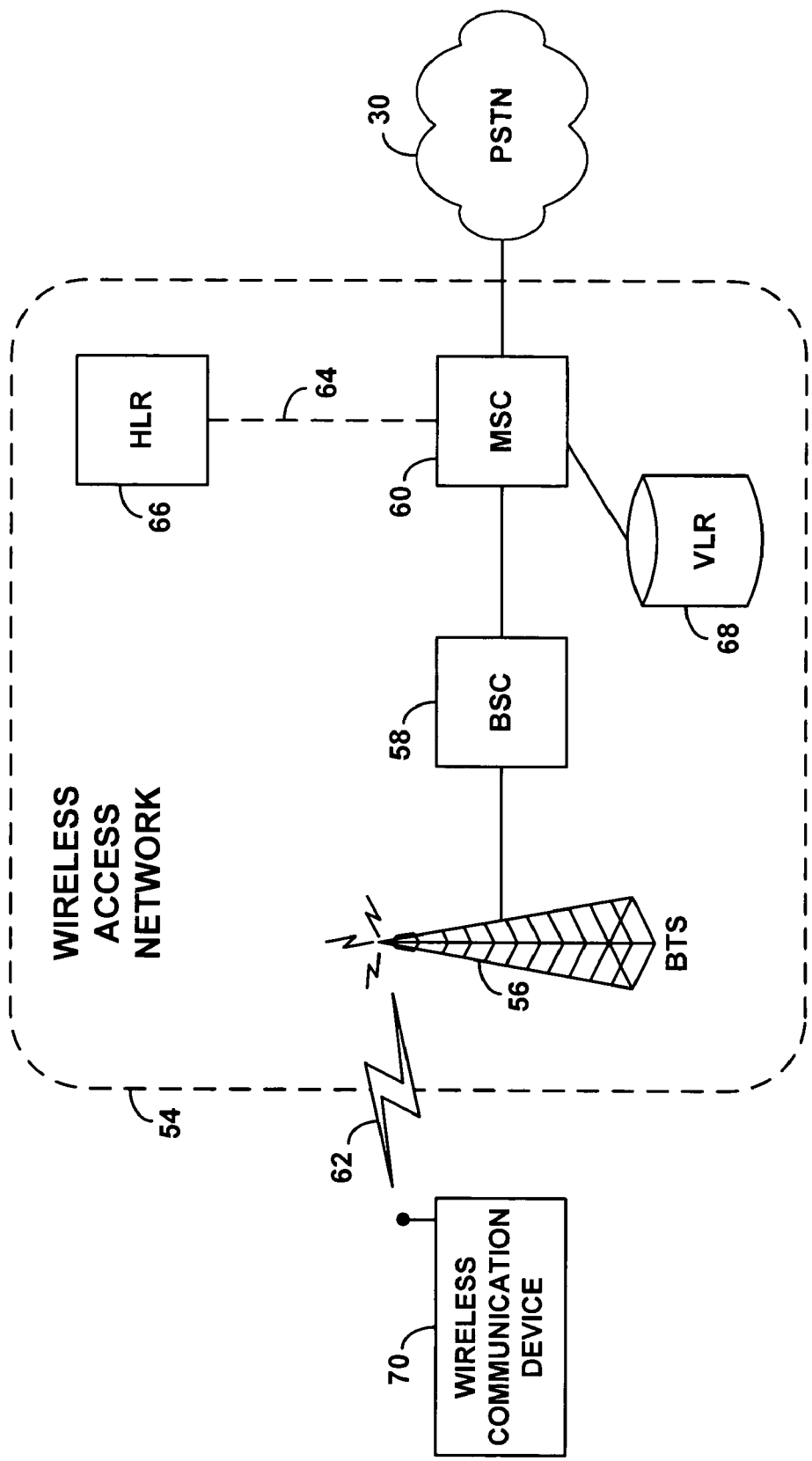
FIG. 4 is a block diagram depicting an exemplary embodiment wireless access network with which the exemplary embodiment can interact.

Referring next to FIG. 4, a simplified block diagram of an exemplary wireless access network 54 is shown. It should be understood, however, that the wireless network could take many other forms as well, and that the arrangement shown in FIG. 4 is provided only by way of example.

As shown in FIG. 4, the exemplary wireless access network 54 includes a base transceiver station (BTS) 56, a base station controller (BSC) 58, and a mobile switching center (MSC) 60, which are arranged and coupled with each other in a manner well known to those of ordinary skill in the cellular telephony field.

BTS 56 comprises a tower with antennas that radiate to define a radio frequency (RF) air interface 62. And BSC 58 communicates with wireless devices over that air interface according to an agreed protocol. Example air interface protocols include Advanced Mobile Phone Service (AMPS), Code Division Multiple Access (CDMA), Time Division Multiple Access (TDMA), and Global System for Mobile communication (GSM). For instance, the air interface protocol could be a CDMA protocol that complies with the well known industry standards IS-95 and cdma2000.

MSC 60 then functions as a switch (similar to CO switch 20) to provide connectivity with other switches in the PSTN 30. Further, MSC 60 may be coupled via a signaling link 64 with a home location register (HLR) 66 that stores service-profiles for various wireless devices. And MSC 60 may include or be interconnected with a visitor location register (VLR) 68 that stores local copies of those profiles for wireless devices that are currently operating within the wireless coverage area of MSC 60. Although FIG. 4 shows BSC 58 and MSC 60 as separate entities, the two entities could instead be co-located and integrated together.

Exemplary wireless access network 54 enables suitably-equipped wireless devices, such as wireless bridges 50, 52, to place and receive calls over the PSTN and/or over one or more other circuit-switched or packet-switched transport networks. FIG. 4 depicts one such wireless device 70 by way of example. Wireless device 70 could be the wireless communication function within wireless bridge 50 or wireless bridge 52, or it could just as well be a handheld cell phone.

Conventionally, wireless device 70 will subscribe to service with a wireless carrier that owns and operates wireless access network 54. Therefore, the carrier would have set up device 70 to operate under a particular directory number (telephone number), which may be termed a "mobile identification number" (MIN) or "mobile directory number" (MDN) for instance. In particular, the carrier would have programmed the assigned directory number into a Number Assignment Module (NAM) block of device 70, and the carrier would have established a service-profile record in HLR 66 for that directory number/device. Further, device would have a unique electronic serial number (ESN), which may be hard coded or programmed into the device.

When device 70 powers on or otherwise enters into the coverage of air interface 62, the device registers with MSC 60, such as by sending a registration message over an air interface access channel and via BSC 58 to MSC 60. MSC 60, in cooperation with other network entities, would then authenticate the device, and HLR 66 would provide MSC 60 with a copy of the device's service profile for storage in VLR 68 and for later reference by MSC 60.

Thereafter, device 70 may place and receive calls on PSTN 30 via the wireless access network 54. For instance, device 70 may originate a call to a given directory number by sending an origination message over air interface 62 and via BTS 56 and BSC 58 to MSC 60, specifying the directory number as dialed digits in the message. BSC 58 would then assign an air interface traffic channel on which device 70 can communicate, and MSC 60 would set up the call to the dialed number. When the called party answers, MSC 60 would then establish a bearer path over a voice trunk, and the call between device 70 and the called party would proceed via a path comprising (i) the air interface traffic channel, (ii) the BTS, BSC and MSC, and (iii) the PSTN.

Similarly, when a PSTN call is placed to the directory number assigned to device 70, the call would be routed to MSC 60 as the switch that is currently serving that directory number. MSC 60 would then page device 70 by sending a page message over an air interface paging channel to the directory number of device 70. Device 70 would then detect the page message and answer the call by requesting a traffic channel on which to communicate. Upon connection of the call, the call may then proceed via a path comprising (i) the PSTN, (ii) the MSC, BSC and BTS, and (iii) the air interface traffic channel.

Note that the wireless access network 54 could also be referred to as a "radio access network" (RAN), since devices communicate with the network via an RF air interface. Further, each device that engages in RF communication with the RAN could be considered a "RAN client."

4. Exemplary Wireless Bridge

Figure 5:
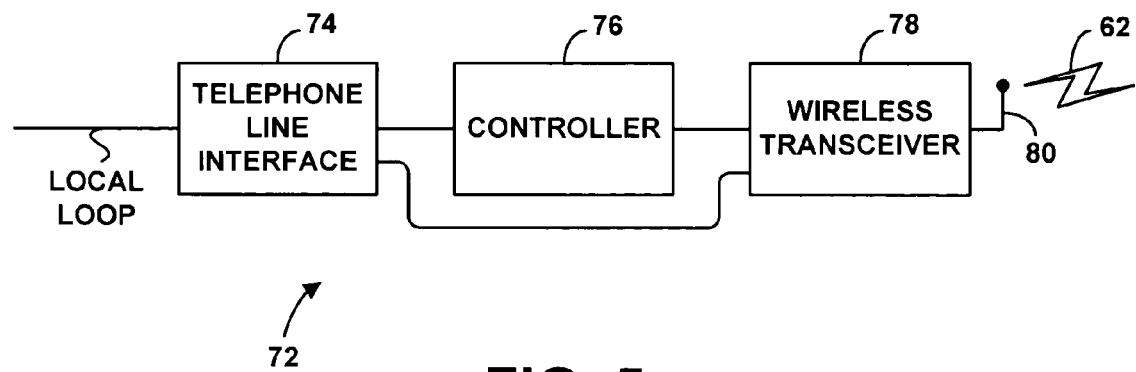
FIG. 5 is a block diagram of a wireless bridge in accordance with the exemplary embodiment.

Referring next to FIG. 5, a simplified block diagram of an exemplary wireless bridge 72 is shown. The wireless bridge could represent both wireless bridge 50 and wireless bridge 52 of FIG. 3.

As illustrated, wireless bridge 72 includes as logical elements a telephone line interface 74, a controller 76, and a wireless transceiver 78. Although these elements are shown in series in the figure, they could equally be arranged in other ways. Further, as logical elements, they could be integrated together in various ways. For instance, the functions of controller 76 and telephone line interface 74 could be integrated as a single element, the functions of controller 76 and wireless transceiver 78 could be integrated as a single element, or the functions of telephone line interface 74, controller 76 and wireless transceiver 78 could all be integrated as a single element. (Note that the wireless bridge 72 could include other elements as well. For example, although not shown, the wireless bridge 72 could include an AC or DC power supply as well as a battery backup to facilitate operation during a power outage.)

Generally speaking, telephone line interface 74 functions to physically interface with a local loop telephone line, such as local loop 22 or local loop 24 for instance. As such, the telephone line interface 74 could take various forms, depending on the form of the local loop telephone line at the point of connection. Mechanisms for physically interfacing with local loop telephone lines are well known in the art and are therefore not described here.

In the exemplary embodiment, telephone line interface 74 connects with controller 76 to exchange signaling and voice communications, and telephone line interface 74 also connects with wireless transceiver 78 to exchange voice communications. As such, telephone line interface 74 could split the local loop signal and deliver one copy of the signal to controller and another copy of the signal to wireless transceiver 78.

Wireless transceiver 78 then functions as a wireless communication device (such as device 70) to place and receive calls via wireless access network 54. In this regard, wireless transceiver 78 will subscribe to wireless service provided by a carrier that operates wireless access network 64, and wireless transceiver 78 will thus have an assigned directory number programmed into a NAM block. Wireless transceiver 78 in turn includes an antenna 80 for communicating over air interface 62 with access network 54.

Figure 6:
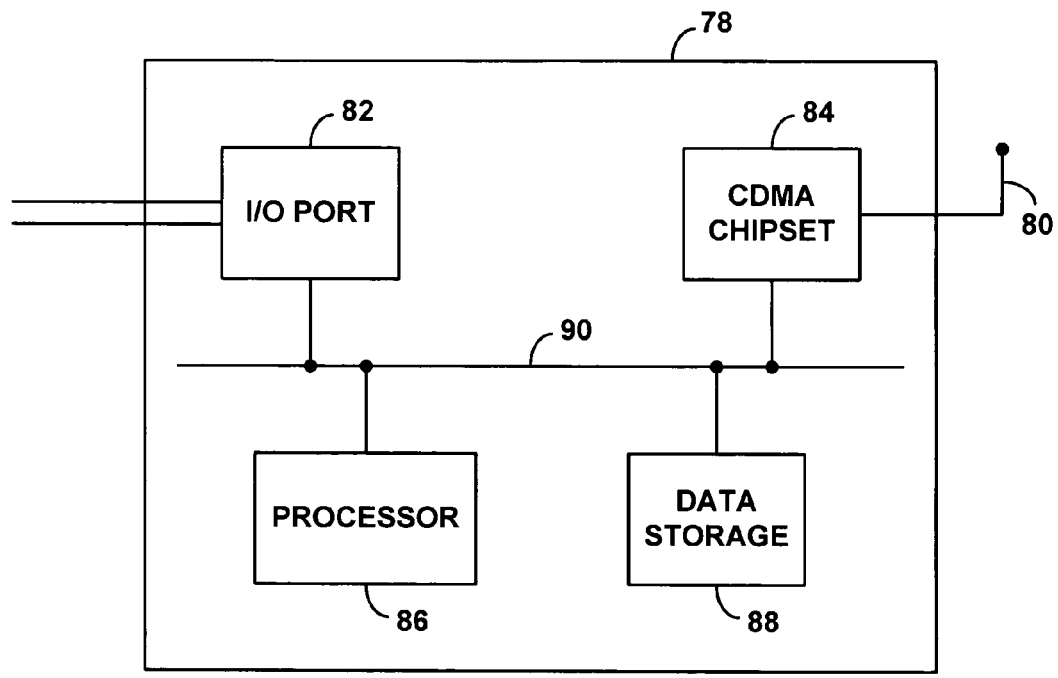
FIG. 6 is a block diagram of a wireless transceiver in accordance with the exemplary embodiment.

FIG. 6 is a simplified block diagram illustrating functional components of an exemplary wireless transceiver 78. As shown in FIG. 6, wireless transceiver 78 includes an input/output (I/O) port 82, a CDMA chipset 84, a processor 86, and data storage 88, all of which may be coupled together by a system bus or other mechanism 90.

I/O port 82 may include one or more leads through which transceiver 78 can communicate with controller 76 and with telephone line interface 74. For example, I/O port 82 may include audio input and output leads for exchanging analog voice-band communications with the telephone line interface 74. Alternatively, if voice communications are digitized, the I/O port could include leads equipped to exchange the digitized voice. As another example, I/O port may include leads through which transceiver 78 can communicate with controller 76, such as to perform the following functions:

(i) REPORTING REGISTRATION STATE, i.e., notifying controller 76 when transceiver is registered in access network 54 and therefore able to place and receive calls.

(ii) ORIGINATING CALLS, i.e., receiving instructions from controller 76 directing transceiver 78 to originate a call to a given directory number.

(iii) ENDING CALLS, i.e., receiving instructions from controller 76 directing transceiver 78 to end an ongoing call (i.e., to hang up).

(iv) REPORTING STATE OF CALL ATTEMPTS AND CALLS, i.e., notifying controller 76 that an attempted call is ringing, or that an attempted call is busy, and notifying controller 76 when a called party answers and when a called party hangs up or a call otherwise ends.

(v) ALERTING FOR INCOMING CALLS, i.e., notifying controller 76 of an incoming call, when transceiver 78 receives a page message from access network 54.

CDMA chipset 84, in turn, may be a chipset arranged to communicate over air interface 62 and with BSC 58 according to a protocol such as cdma2000. Examples of such chipsets are those available from Qualcomm Incorporated, such as the Qualcomm MSM6150™ chipset for instance. Chipset 84 will then interface with antenna 80 to facilitate air interface communications.

Processor 86 may comprise one or more general purpose or dedicated processors, such as general purpose Intel brand processors and/or discrete digital signal processors (DSPs) or application specific integrated circuits (ASICs). And data storage 88 may comprise volatile and/or non-volatile memory, such as flash memory for instance. Further, data storage 88 could be integrated in whole or in part with processor 86.

In the exemplary embodiment, data storage 88 will include a NAM block that holds the directory number (e.g., MIN) under which transceiver 78 is assigned to operate. Further, data storage 88 will include machine language instructions that are executable by processor 86 to carry out various functions described herein. For instance, the instructions may be executable to facilitate the functions noted above.

By way of example, when chipset 84 successfully registers with access network 54, processor 86 would receive a signal from the chipset and would responsively output a notification signal via I/O port 82. As another example, when port 82 receives an instruction from controller 76 directing transceiver 78 to originate a call to a given directory number, processor 86 would receive that instruction from port 82 and would responsively instruct chipset 84 to originate the call to that number. As still another example, when port 82 receives an instruction from controller 76 directing transceiver 78 to end an ongoing call, processor 86 would receive that instruction from port 82 and would responsively instruct chipset 84 to end the call.

As yet another example, when chipset 84 is attempting to place a call and receives a signal from access network 54 indicating that the call is ringing or is busy, processor 86 would receive a corresponding signal from chipset 84 and would responsively output a corresponding ring or busy signal via I/O port 82. And as still another example, when the called party answers, processor 86 would receive a corresponding signal from chipset 84, and processor 84 would responsively output an answer-signal via port 82.

Still further, as another example, when the called party hangs up or the call otherwise ends (e.g., if the wireless connection is lost), processor 86 would receive a corresponding signal from chipset 86 and would responsively output a call-disconnect signal via port 82. And as one other example, when chipset 84 receives a page message indicating an incoming call, processor 86 would receive a corresponding signal from chipset 84 and would responsively output a ring-signal via port 82.

Figure 7:
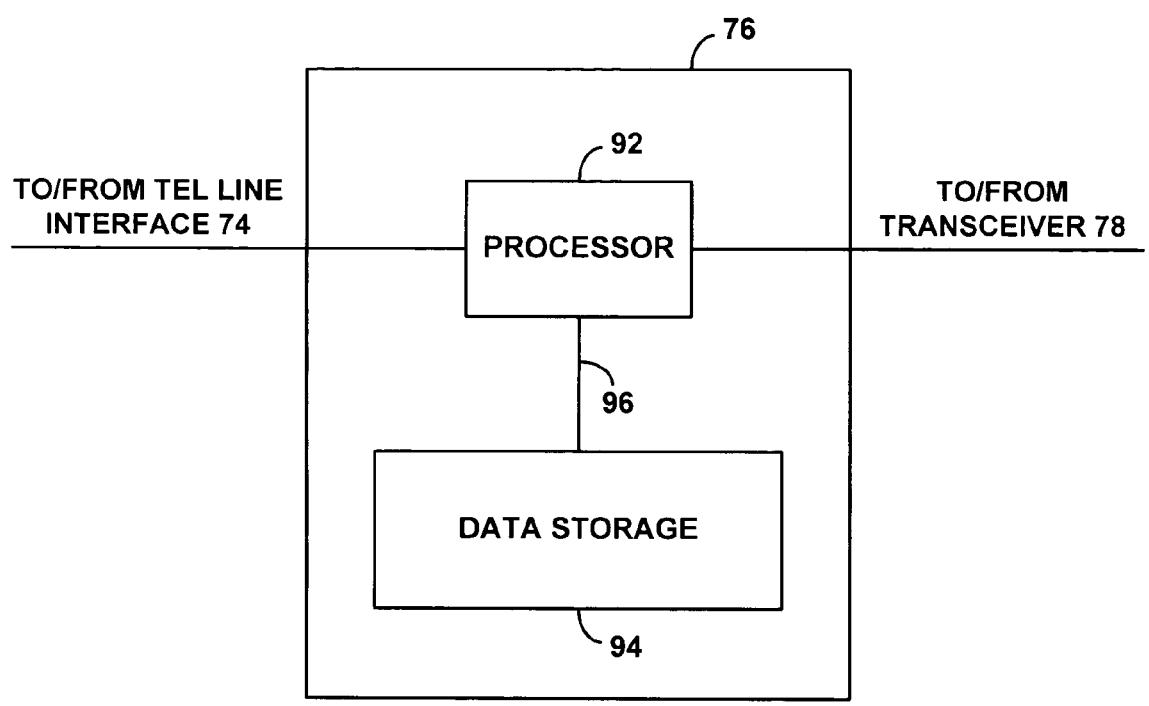
FIG. 7 is a block diagram of a wireless bridge controller in accordance with the exemplary embodiment.

Now returning to FIG. 5, controller 76 of the exemplary wireless bridge 72 may provide the core interface logic for interfacing between the local loop telephone line and the wireless transceiver 78. FIG. 7 is a simplified block diagram illustrating functional components of an exemplary controller 76.

As shown in FIG. 7, the exemplary controller 76 includes a processor 92 and data storage 94, which could be coupled together by a system bus or other mechanism 96. Processor 92 may comprise one or more general purpose or dedicated processors, and data storage 94 may comprise volatile and/or non-volatile memory, such as flash memory for instance. Further, data storage 94 could be integrated in whole or in part with processor 92.

Data storage 94 includes machine language instructions executable by processor 92 to facilitate interfacing between the local loop and the wireless transceiver 78. On the local loop side, one such function is emulating a SLIC, so that the local loop can behave as it normally would (i.e., as if the local loop were connected to switch 20). This SLIC functionality may include the following functions:

(i) DETECTING ON-HOOK and OFF-HOOK CONDITIONS, i.e., detecting when the local loop goes on-hook or off-hook.

(ii) DIAL-TONE GENERATION, i.e., generating and applying a conventional dial-tone on the local loop when the local loop goes off-hook.

(iii) DIGIT-DETECTION, i.e., detecting DTMF tones on the local loop and translating those tones to digital representations of the dialed digits (and perhaps also detecting pulse dialing and translating the pulse dialing into digit representations).

(iv) RING/BUSY TONE GENERATION, i.e., generating and applying a ringing or busy signal on the local loop, to indicate the status of a call attempt.

(v) RINGING, i.e., applying an appropriate voltage or other signal on the local loop to cause customer premises telephone equipment to ring, so as to alert of an incoming call.

Further, note that controller 76 could include other components (not shown) to assist in SLIC emulation. For example, controller 76 could include a discrete DTMF detection circuit as well as analog-digital conversion circuitry. Other examples are possible as well.

In the exemplary embodiment, processor 94 then interfaces between the local loop and the wireless transceiver 78, so as to translate between call functions carried out on the local loop and call functions carried out by the wireless transceiver 78. For instance, processor 94 may interface between the local loop and the wireless transceiver by (i) translating between local loop signaling on the local loop telephone line and wireless-access-network signaling communicated by the wireless transceiver, (ii) performing SLIC emulation, and (iii) passing voice communications between the local loop and the wireless transceiver.

More particularly, to facilitate basic telephone services, processor 94 may interface between the local loop and the wireless transceiver by carrying out functions such as the following:

(i) ORIGINATING CALLS. In response to a directory number detected on the local loop, the processor instructs the wireless transceiver 78 to originate a call to the directory number. In this regard, the processor preferably functions to detect when a complete number has been dialed, such as when 10 digits of a conventional North American number has been dialed, and to then send those dialed digits to transceiver 78 with an instruction for transceiver to originate a call to that number.

(ii) ENDING ONGOING CALLS. In response to a call-disconnect signal from transceiver 78, the processor applies a dial-tone to the local loop. And in response to the local loop changing to an on-hook state during a call, the processor instructs transceiver 78 to end the call.

(iii) ALERTING OF CALL-ATTEMPT STATE. The processor generates and applies a ringing or busy signal on the local loop in response to a corresponding signal received from transceiver 78 when transceiver 78 is attempting to originate a call.

(iv) ALERTING OF INCOMING CALLS. The processor applies a ring voltage or other signal on the local loop to cause customer premises telephone equipment to ring, in response to a ring-signal received from transceiver 78.

(v) ANSWERING INCOMING CALLS. The processor instructs transceiver 78 to answer an incoming call in response to the local loop going off hook when ringing.

Further, processor 94 may also interface between the local loop and the wireless transceiver to facilitate enhanced telephone services such as the following:

(i) CALLER-ID. When access network 54 alerts wireless transceiver 78 of an incoming call and provides caller-ID information, transceiver 78 would convey that information to controller 76. Processor 94 would then convert the caller-ID information to a form suitable for delivery via the local loop telephone line (such as signaling between the first two ring tones applied on the local loop).

(ii) CALL-WAITING. During a call, when access network 54 alerts wireless transceiver 78 of an incoming call, transceiver 78 would signal to controller 76, and processor 94 would apply a call-waiting signal on the local loop. In turn, in response to a "flash" (quick on-hook/off-hook transition) on the local loop, controller 94 would instruct transceiver 78 to "flash" the call in the wireless access network (e.g., by sending an origination signal to the MSC), so as to switch to the waiting call.

(iii) CONFERENCE CALLING. During a call, processor 94 would recognize a flash on the local loop and would responsively direct wireless transceiver 78 to flash the call in the wireless access network. This would cause the wireless access network to provide a dial tone and to allow a second call origination. Processor 94 would then responsively provide a dial tone on the local loop and allow the local loop to dial a second call, and processor 94 would set up the second call via the wireless access network. In turn, processor 94 would detect another flash on the local loop and would responsively deliver a corresponding flash in the wireless access network, which would cause the wireless access network to tie together the first and second calls.

(iv) MESSAGE-WAITING INDICATION. The wireless transceiver 78 could receive a message-waiting indicator (through SMS or other over-the-air signaling from access network 54) indicating that one or more voice mail messages are waiting in a voice mailbox under the wireless transceiver's directory number (i.e., under the corresponding local loop's directory number). Processor 94 would then responsively apply a conventional message-waiting indicator, such as a stutter dial-tone or other predefined signal, on the local loop.

Other examples of interface functions to facilitate basic or enhanced telephone services could be provided as well. Thus, it should be understood that the functions described above are merely illustrative and not limiting.

As presently contemplated, a wireless bridge 72 can be provided in the form of a line interface card or other apparatus that is configured to sit on a rack at the CO 12. Thus, instead of connecting a local loop telephone line with a line interface card of the type that the ILEC might normally provide, the local loop telephone line can be connected directly with the wireless-bridge line interface card. Conveniently, this arrangement would facilitate easy transfer of the local loop from ILEC service to wireless CLEC service, by simply replacing the existing line interface card with a wireless-bridge line interface card.

More generally, the wireless bridge could be situated anywhere along the local loop telephone line between the customer premises and the CO switch 20 (i.e., between the customer premises and the point where the CO switch would normally connect with the local loop). For instance, the wireless bridge could be interfaced with the local loop telephone line at a point between the customer premises and a SLIC (i.e., between the customer premises and the point where a SLIC would normally be provided on the line). Or the wireless bridge could be interfaced with the local loop telephone line at a point between the SLIC and the switch (i.e., between the SLIC and the point where the CO switch would normally connect).

Further, as noted above, the wireless bridge could be interfaced with the local loop telephone line either at the telephone company CO or at some other location along the local loop telephone line between the customer premises and the CO. For example, the wireless bridge could be interfaced with a local loop telephone line at a digital concentrator or at a cable head-end. Other examples are possible as well.

5. Exemplary Multi-Line Wireless Bridge

As also noted above, the exemplary embodiment can be ideally carried out at a point where multiple local loop telephone lines are co-located, so as to wirelessly interface multiple local loop telephone lines with respective wireless transceivers at once. One way to accomplish this is to interface a discrete wireless bridge respectively with each local loop telephone line at the location. Another way to accomplish this is to provide a multi-line wireless bridge that interfaces multiple local loop telephone lines with multiple wireless transceivers.

Figure 8:
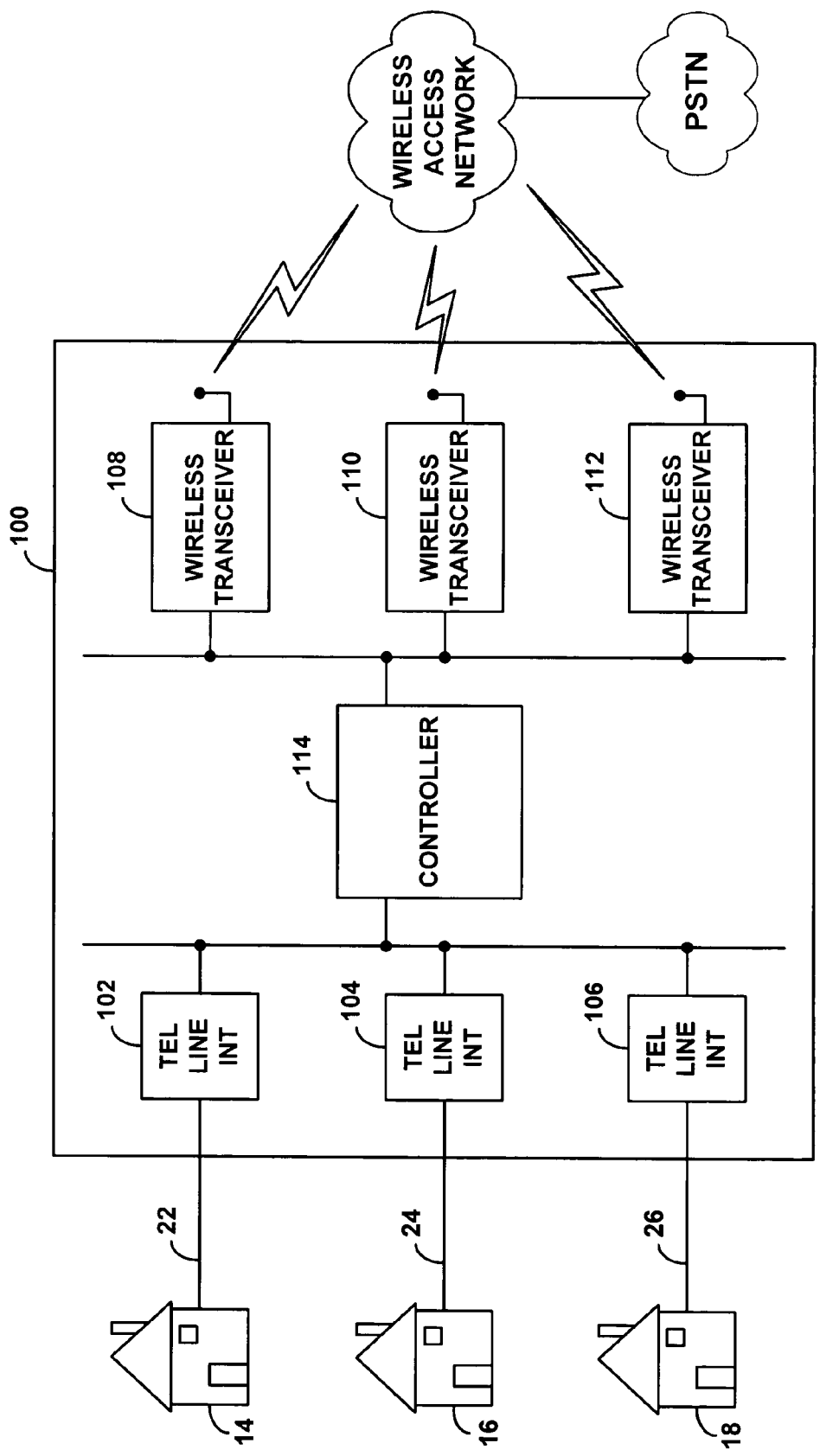
FIG. 8 is a block diagram of a multi-line wireless bridge in accordance with the exemplary embodiment.

FIG. 8 is a block diagram of an exemplary multi-line wireless bridge 100 coupled with local loops 22, 24 and 26 of FIG. 1. As shown in FIG. 8, multi-line wireless bridge 100 includes multiple telephone interface ports 102, 104, 106 (which could cooperatively define a multi-line telephone line interface), multiple wireless transceivers 108, 110 and 112 (which could cooperatively define a multi-transceiver wireless communication interface), and a common controller 114. The multi-line wireless bridge could be provided within a housing as a single apparatus, which could be mounted on a rack at the CO or at another suitable location.

It should be understood that the number of telephone line interface ports and wireless transceivers can differ from that shown. Further, although each telephone line interface port is shown coupled with a single local loop telephone line, it should be understood that a given telephone line interface port could be coupled with multiple local loop telephone lines. For instance, if local loops 22–26 pass through a digital concentrator and are multiplexed together on a T1 line, telephone line interface ports 102–106 could be replaced with a single telephone line interface port arranged to receive the T1 line. Either that interface or controller 114 would then be arranged to de-multiplex the local loop signals so that controller 114 can treat the local loops individually.

Each telephone line interface port will function largely the same as the telephone line interface 74 of FIG. 5, and each wireless transceiver will function largely the same as the wireless transceiver 78 of FIG. 5. Common controller 114, in turn, will function largely the same as controller 76, except common controller 114 will interface between multiple local loop telephone lines and multiple transceivers, rather than just between a single local loop and a single wireless transceiver.

In accordance with the exemplary embodiment, controller 114 can be arranged to correlate each local loop telephone line with a respective wireless transceiver. To do so, for instance, controller 114 may include or have access to a set of mapping data that statically correlates each telephone line interface port with a respective wireless transceiver. For instance, the mapping data may correlate telephone line interface port 102 with wireless transceiver 108, telephone line interface port 104 with wireless transceiver 110, and telephone line interface port 106 with wireless transceiver 112.

Controller 114 may then interface telephone signaling according to that mapping data. For example, when controller 114 detects a dialed directory number on local loop 24, controller 114 may instruct wireless transceiver 110 to originate a call to that number. And controller 114 could pass voice-band communications (e.g., digitized) between wireless transceiver 110 and telephone line interface port 104. Controller 114 may also maintain state records separately for each telephone line interface port and each wireless transceiver, so that controller 114 can concurrently manage the interfaces between the various local loops and wireless transceivers.

Alternatively, controller 114 could work together with access network 54 to dynamically correlate wireless transceivers with local loops. For instance, when access network 54 seeks to set up a call to a given local loop directory number, the network could set up the call to any of the wireless transceivers, and controller 114 could then dynamically map that call to the local loop having the called directory number. And when controller 114 detects a number dialed on a local loop, the controller could direct any of the wireless transceivers to set up the call to that number via the access network 54.

By way of example, each wireless transceiver of bridge 100 could subscribe to service in wireless access network 54 under a respective directory number, and each local loop that is interfaced with bridge 100 can be assigned to operate under another respective directory number. Data in PSTN 30 and/or in HLR 66 could then list each of those local loop directory numbers as wireless numbers currently served by MSC 60, so that calls placed to any of those local loop numbers would be set up via MSC 60. Further, MSC 60 could maintain or have access to (i) a list of all of the local loop directory numbers served by bridge 100 and (ii) a list of all wireless transceiver directory numbers in bridge 100.

In practice, when the MSC 60 then receives a request to set up a call to one of the local loop directory numbers, the MSC could randomly or sequentially select one of the wireless transceiver directory numbers and set up the call to that wireless transceiver. Further, in the page message that the MSC sends to the wireless transceiver, the MSC can include an indication of the true local loop directory number being called. For instance, the MSC could include the local loop directory number as supplemental digits in the caller-ID block of the page message. Controller 114 could then ring the local loop that has that directory number. And once the call is connected, controller 114 could maintain a correlation between the local loop and the wireless transceiver until the call ends.

Similarly, when controller 114 detects a directory number dialed on one of the local loops, controller 114 could randomly or sequentially select a wireless transceiver and cause the wireless transceiver to place a call to that directory number via wireless access network 54. In doing so, the controller could cause the wireless transceiver to dial some supplemental digits to indicate the directory number of the local loop that is originating the call. When MSC 60 receives the origination message from the wireless transceiver, the MSC could then read the supplemental digits to learn the directory number of the calling local loop and could set up the call using that directory number as the calling number. (For instance, the MSC could include the local loop directory number as the calling number in its signaling with another PSTN switch). Both the MSC 60 and the controller 114 could then maintain a correlation between the local loop directory number and the wireless transceiver directory number until the call ends.

Advantageously, dynamic correlation of local loops with wireless transceivers can allow the bridge 100 to have fewer wireless transceivers than local loop connections, thereby reducing the cost to manufacture and operate the bridge 100. In particular, the bridge 100 could include just enough wireless transceivers to support a statistically expected number of concurrent calls, even though the bridge is connected to a greater number of local loops. Although this could result in some blocked calls, the cost-benefit analysis may weigh in favor of the reduced cost of manufacture and operation.

6. Exemplary Operation

Figure 9:
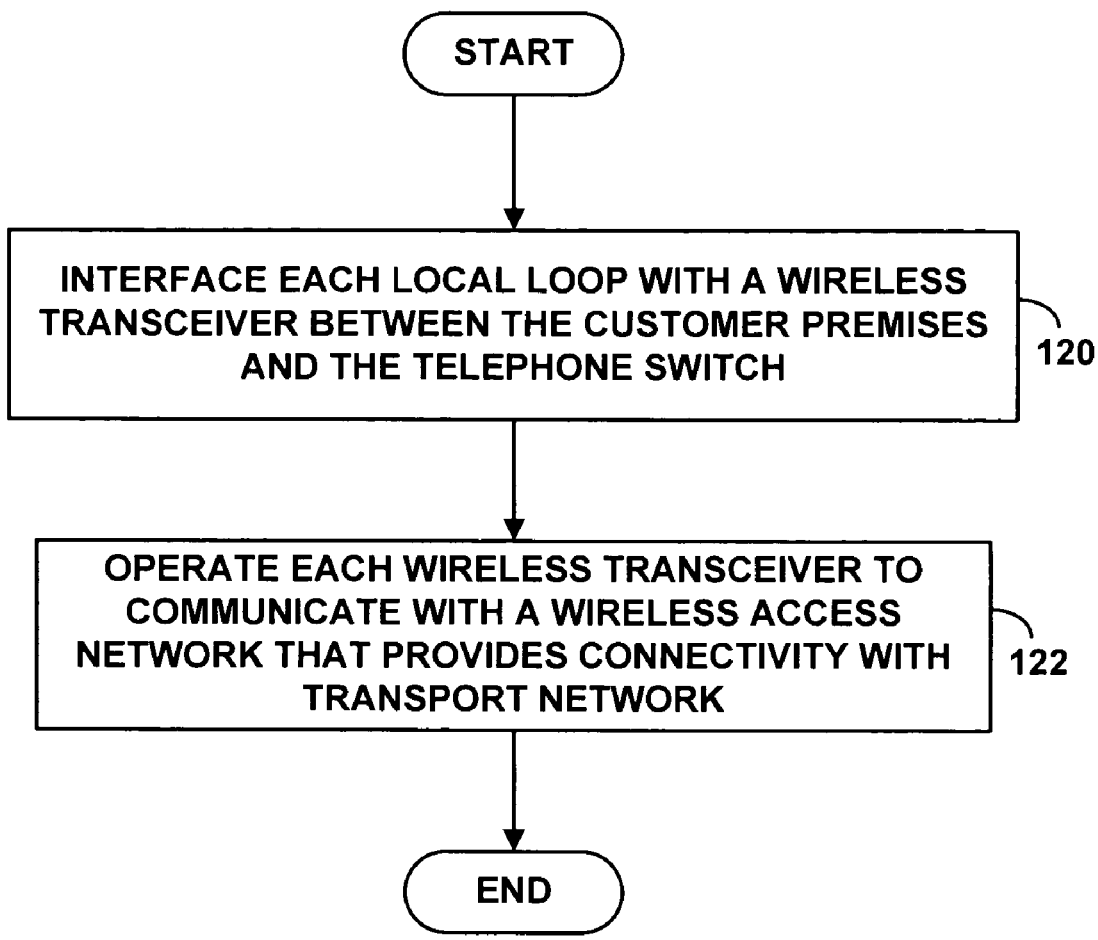
FIG. 9 is a flow chart depicting functions that can be carried out in accordance with the exemplary embodiment.
Figure 10:
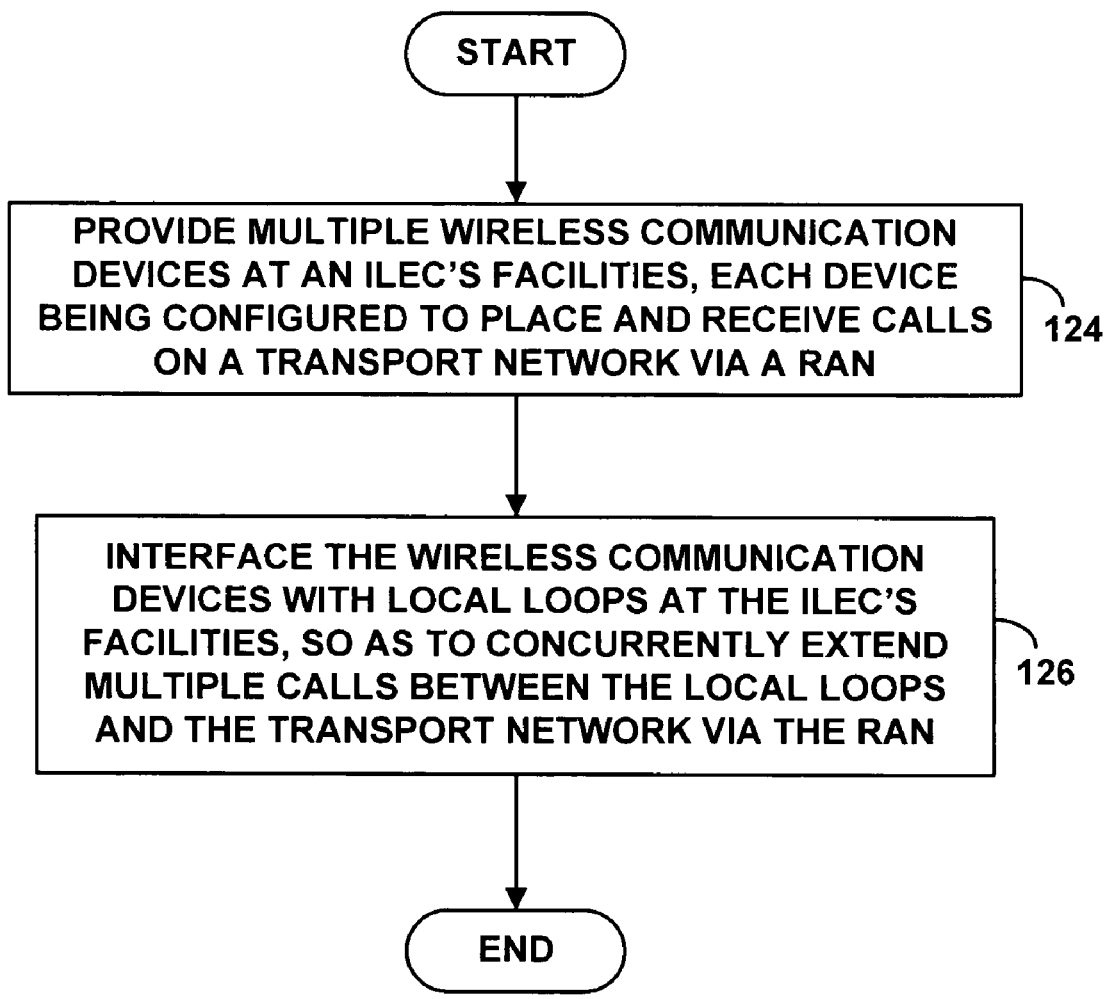
FIG. 10 is another flow chart depicting functions that can be carried out in accordance with the exemplary embodiment.

FIGS. 9 and 10 are flow charts illustrating some of the functions that can be carried out in accordance with the exemplary embodiment.

FIG. 9 first depicts a method of using local loop telephone lines that extend between a telephone switch and multiple different customer premises. By way of example, the local loop telephone lines may be lines 22–26 shown in FIG. 1, each of which could normally be coupled with a telephone switch that provides connectivity with a transport network such as the PSTN.

As shown in FIG. 9, at block 120, the method involves interfacing each local loop telephone line with a respective wireless transceiver at a point between the telephone switch and the customer premises to which the local loop telephone line extends. Further, as shown at block 122, the method involves operating each wireless transceiver so as to communicate with a wireless access network that provides connectivity with the transport network.

That way, communications can flow between a given customer premises and the transport network via a communication path comprising (i) the local loop extending from that customer premises, (ii) the wireless transceiver interfaced with that local loop, and the (iii) the wireless access network. And at the same time, communications can flow between another given customer premises and the transport network via a communication path comprising (i) the local loop extending from that other customer premises, (ii) the wireless transceiver interfaced with that other local loop, and (iii) the wireless access network.

FIG. 10 next depicts a method that can be carried out in a system in which a first telecommunications company operates facilities for communicatively connecting local loop telephone lines with a transport network and a second telecommunications company operates a radio access network (RAN) for communicatively connecting wireless communication devices with the transport network.

As shown in FIG. 10, at block 124, the method involves providing multiple wireless communication devices at the first company's facilities, with each wireless communication device being configured to register on the RAN and to place and receive calls on the transport network via the RAN. Further, as shown at block 126, the method involves interfacing the multiple wireless communication devices with the local loop telephone lines at the first company's facilities, so as to concurrently extend multiple calls between the local loop telephone lines and the transport network via a communication path comprising the wireless communication devices and the RAN.

7. Transitioning from Wireless to Wireline Operation

As noted above, the exemplary embodiment can enable a wireless telephone company to easily enter into the local phone market by simply leasing local loop telephone lines from the ILEC and interfacing each line with a respective wireless transceiver that is set to place and receive calls wirelessly. One of the benefits of this arrangement is that the CLEC thereby connects wirelessly with each local loop telephone line.

This arrangement can also be used to facilitate transitioning into more full-scale landline telephone service. For instance, a CLEC can use the exemplary embodiment so as to readily sign up and transition ILEC customers to the CLEC's local phone service, by wirelessly interfacing to each customer's local loop. Once the CLEC signs up enough customers to justify the greater expense of serving those customers through a landline arrangement, the CLEC can then trunk those local loops to its own switching equipment or to another switch that the CLEC has arranged to use.

To facilitate this easy transition, each exemplary wireless bridge could be equipped with alternative network connections. One connection could be a wireless transceiver, which could work in the manner described above. And another connection could be a landline interface, which could be arranged for connection to the ILEC's switching infrastructure or to a trunk leading to a CLEC switch. When the CLEC opts to transition from wireless operation to landline operation, the CLEC can then set the wireless bridge to use the landline network interface instead of the wireless transceiver.

Alternatively, each wireless bridge could be equipped with an RF-over-cable port that facilitates landline communication with access network 54. For instance, each wireless bridge could have an RF-over-fiber port, which could connect with a fiber bundle extending to BTS 56 or BSC 58. That way, instead of exchanging RF communications with the access network 54 via air interface 62, the bridge could exchange RF communications via fiber. Thus, once the CLEC opts to transition from wireless to landline operation, the CLEC could then set the wireless bridge to use the RF-over-cable connection.

8. Conclusion

An exemplary embodiment of the present invention has been described above. Those skilled in the art will understand, however, that changes and modifications may be made to the embodiment described without departing from the true scope and spirit of the invention, which is defined by the claims.

What is claimed is:

1. A method for use of local loop telephone lines that normally extend between a telephone company switch and multiple different customer premises, including a first local loop telephone line extending between the telephone company switch and a first customer premises, and a second local loop telephone line normally extending between the telephone company switch and a second customer premises, wherein the telephone company switch provides connectivity with a transport network, and wherein the telephone company switch resides at a telephone company central office, the method comprising the following steps:

at the telephone company central office, interfacing each of the local loop telephone lines with a respective wireless transceiver between the telephone company switch and the customer premises to which the local loop telephone line extends; and operating each wireless transceiver to communicate with a wireless access network that provides connectivity with the transport network, so as to communicatively connect each local loop telephone line with the transport network without use of the telephone company switch, whereby (i) communications then flow between the first customer premises and the transport network via a first communication path comprising the first local loop telephone line, a first wireless transceiver, and the wireless access network, and (ii) communications then flow between the second customer premises and the transport network via a second communication path comprising the second local loop telephone line, a second wireless transceiver, and the wireless access network.

2. The method of claim 1, wherein the wireless access network comprises a cellular telephone system having a base transceiver station, a base station controller, and a mobile switching center connected with the transport network.

3. The method of claim 2, further comprising:

arranging each of the wireless transceivers to operate under a respective directory number in the cellular telephone system.

4. The method of claim 3, wherein arranging each of the wireless transceivers to operate under a respective directory number in the cellular telephone system comprises:

arranging a given wireless transceiver to operate under a directory number that is assigned to the local loop with which the given wireless transceiver is being interfaced.

5. The method of claim 1, wherein each wireless transceiver operates under a respective directory number, whereby a call placed via the transport network to a given directory number is routed to the wireless access network, via the wireless network to a wireless transceiver operating under the given directory number, and in turn via a given local loop telephone line to a given customer premises.

6. The method of claim 5, further comprising:

assigning equipment at the given customer premises to operate under the given directory number.

7. The method of claim 1, wherein interfacing each local loop telephone line with a respective wireless transceiver comprises:

statically correlating the local loop telephone line with the respective wireless transceiver.

8. The method of claim 1, wherein interfacing each local loop telephone line with a respective wireless transceiver comprises:

dynamically correlating the local loop telephone line with the respective wireless transceiver.

9. The method of claim 1, wherein each local loop telephone line is operatively linked with a respective subscriber line interface circuit, the method further comprising:

carrying out the interfacing step, with respect to a given local loop telephone line, at a point between (i) the subscriber line interface circuit with which the given local loop telephone line is operatively linked and (ii) the customer premises to which the given local loop telephone line extends.

10. The method of claim 1, further comprising:

concurrently (i) operating the first wireless transceiver to pass communications between the first customer premises and the transport network and (ii) operating the second wireless transceiver to pass communications between the second customer premises and the transport network.

11. The method of claim 1, wherein interfacing each local loop telephone line with a respective wireless transceiver comprises:

translating between (i) local loop signaling on the local loop telephone line and (ii) wireless-access-network signaling communicated between the respective wireless transceiver and the wireless access network.

12. The method of claim 11, wherein translating between local loop signaling and wireless-access-network signaling comprises translating between signaling to facilitate at least one enhanced telephone service selected from the group consisting of:

caller-ID;
call-waiting;
conference calling; and
message-waiting indication.

13. The method of claim 11, wherein interfacing each local loop telephone line with a respective wireless transceiver further comprises:

emulating a local loop on the local loop telephone line.

14. The method of claim 11, wherein emulating a local loop comprises performing functions selected from the group consisting of:

detecting an off-hook event;
delivering a dial tone;
detecting dialed digits;
delivering a ring signal;
delivering a busy signal; and
detecting an on-hook event.

15. The method of claim 11, wherein interfacing each local loop telephone line with a respective wireless transceiver further comprises:

receiving outbound voice communications from the local loop telephone line and passing the outbound voice communications to the respective wireless transceiver for transmission via the wireless access network to the transport network; and receiving inbound voice communications that the respective wireless transceiver receives from the transport network via the wireless access network, and passing the inbound voice communications to the local loop telephone line for transmission to the customer premises to which the local loop telephone line extends.

16. The method of claim 1, wherein the transport network comprises the public switched telephone network.

17. The method of claim 1, further comprising carrying out the steps at a telephone company central office.

18. In a system comprising a first telecommunications company that operates a central office including a switch for communicatively connecting local loop telephone lines with a transport network, and a second telecommunications company that operates a radio access network (RAN) for communicatively connecting wireless communication devices with the transport network, a method comprising:

providing multiple wireless communication devices at the first telecommunications company's facilities, each wireless communication device being configured to register on the RAN and to place and receive calls on the transport network via the RAN; and interfacing the multiple wireless communication devices with the local loop telephone lines at the first company's central office, so as to concurrently extend multiple calls between the local loop telephone lines and the transport network via a communication path comprising the wireless communication devices and the RAN.

19. The method of claim 18, wherein the transport network comprises the public switched telephone network.

20. The method of claim 18, wherein each of the wireless devices operates under a respective unique directory number in the RAN.

21. The method of claim 18, further comprising:

the second telecommunications company paying the first telecommunications company for access to the local loop telephone lines.

22. The method of claim 18, wherein interfacing the multiple wireless communication devices with the local loop telephone lines at the first telecommunications company's central office comprises:

translating between (i) local loop signaling on the local loop telephone lines and (ii) RAN signaling communicated between the wireless communication devices and the RAN.

23. The method of claim 22, wherein interfacing the multiple wireless communication devices with the local loop telephone lines at the first telecommunications company's central office further comprises:

receiving outbound voice communications from the local loop telephone lines and passing the outbound voice communications to the wireless communication devices for transmission via the RAN to the transport network; and receiving inbound voice communications that the wireless communication devices receive from the transport network via the RAN, and passing the inbound voice communications to the local loop telephone lines.

24. A system comprising:

a telephone line interface comprising multiple ports configured to connect with telephone lines extending to multiple different customer premises locations, including a first port configured to connect with a first telephone line extending to a first customer premises location and a second port configured to connect with a second telephone line extending to a second customer premises location;

a radio access network (RAN) interface communicatively linked with the telephone line interface, the RAN interface comprising multiple RAN clients each configured to register on a RAN under a respective client identifier and to then operate under the respective client identifier when placing and receiving voice calls on a transport network via the RAN; and call-interface logic for bridging multiple voice calls concurrently between the RAN interface and the telephone line interface, so as to extend at least (i) a first voice call between the first customer premises location and the transport network via the first RAN client and (ii) a second voice call between the second customer premises location and the transport network via the second RAN client, wherein the telephone line interface, the RAN interface, and the call-interface logic are cooperatively located at a telephone company central office, and wherein the telephone company central office further includes a switch operable to provide connectivity with the transport network.

25. The system of claim 24, further comprising local loop emulation logic for emulating a local loop respectively on each telephone line.

26. The system of claim 24, integrated as a single apparatus.

27. A telecommunications system comprising:

a telephone line interface configured to connect with a plurality of telephone lines that extend to respective customer premises locations, wherein the telephone line interface emulates a local loop respectively on each telephone line;

a radio access network (RAN) interface communicatively linked with the telephone line interface, the RAN interface comprising multiple RAN clients each configured to register on a RAN under a respective client identifier and to then operate under the respective client identifier to place and receive voice calls on a transport network via the RAN; and logic operative to bridge the RAN clients with the telephone lines, so that voice calls from the customer premises locations extend via the RAN to the transport network and voice calls from the transport network extend via the telephone lines to the customer premises locations, wherein the telephone line interface, the RAN interface, and the logic are cooperatively located at a telephone company central office, and wherein the telephone company central office further includes a switch operable to provide connectivity with the transport network.

28. The telecommunications system of claim 27, wherein at least a portion of the logic resides in a component selected from the group consisting of (i) a controller communicatively linked with both the telephone line interface and the RAN interface, (ii) the telephone line interface and (iii) the RAN interface.

29. The telecommunications system of claim 27, integrated as a single apparatus.

\* \* \* \* \*

UNITED STATES PATENT AND TRADEMARK OFFICE
CERTIFICATE OF CORRECTION

PATENT NO. : 7,187,946 B2  Page 1 of 1
APPLICATION NO. : 10/677784
DATED : March 6, 2007
INVENTOR(S) : Palan It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 429 days Delete the phrase "by 429 days" and insert -- by 315 days--

Signed and Sealed this

Sixteenth Day of October, 2007

JON W. DUDAS
*Director of the United States Patent and Trademark Office*